United States Patent [19]

Mizuguchi et al.

[11] 4,215,028
[45] Jul. 29, 1980

[54] THERMOSETTING RESIN, AND ITS PRODUCTION AND USE

[75] Inventors: Ryuzo Mizuguchi, Tondabayashi; Atushi Takahashi, Kyoto; Shinichi Ishikura, Takatsuki; Akimitsu Uenaka, Suita, all of Japan

[73] Assignee: Nippon Paint Co., Ltd., Osaka, Japan

[21] Appl. No.: 927,038

[22] Filed: Jul. 24, 1978

Related U.S. Application Data

[63] Continuation-in-part of Ser. No. 722,330, Sep. 10, 1976, abandoned.

[30] Foreign Application Priority Data

Jun. 24, 1976 [JP] Japan .................................. 51-75102

[51] Int. Cl.$^2$ .................... C08F 220/04; C08F 220/06

[52] U.S. Cl. ............................ 260/29.6 TA; 428/461; 428/500; 428/511; 428/515; 526/123; 526/146; 526/218; 526/227; 526/234; 526/258; 526/273; 526/287; 526/307; 526/312

[58] Field of Search ............... 526/287, 258, 273, 307, 526/312, 123, 146, 218, 227, 234; 260/29.6 TA

[56] References Cited

U.S. PATENT DOCUMENTS 3,861,948   1/1975   Samour et al. ........................ 526/312

Primary Examiner—Harry Wong, Jr.
Attorney, Agent, or Firm—Wenderoth, Lind & Ponack

[57] ABSTRACT

A thermosetting resin of self cross-linking type which is prepared by polymerization of at least one polymerizable monomer having an ampho-ion structure, at least one polymerizable monomer containing an oxirane group and at least one other monomer and can afford a hardened film or article of good physical properties when cross-linked.

6 Claims, No Drawings

THERMOSETTING RESIN, AND ITS PRODUCTION AND USE

This is a continuation-in-part application of our co-pending application Ser. No. 722,330, filed Sept. 10, 1976, now abandoned.

The present invention relates to a thermosetting (thermosettable) resin, and its production and use. More particularly, it relates to a linear polymer having specific cross-linkable functional groups which does not substantially undergo cross-linking or hardening reaction under the polymerization conditions for producing the same, and its production and use.

Hitherto, there have been known various thermosetting resins of self cross-linking type, which are useful for various purposes and especially as resin components for painting and as materials for molding. In production of such resins by polymerization of monomeric components, however, the produced resins have more or less a tendency of undergoing cross-linking under the polymerization conditions so as to cause gelation. Thus, the reaction mixture during polymerization can not be free from resinous lumps produced by the gelation, and this may prevent the reaction mixture from its direct use as a painting composition or as a molding material. Further, the elimination of the resinous lumps from the reaction mixture may require a troublesome operation.

As the result of the extensive study to provide a thermosetting resin of self cross-linking type which does not substantially undergo cross-linking under the polymerization conditions for producing the same, it has been found that the polymerization of monomeric components including a monomer having an amphoteric ion group and a monomer having an oxirane group affords a linear polymer having the amphoteric ion group and the oxirane group as the cross-linkable functional groups, which does not undergo cross-linking under the polymerization conditions. It has also been found that, when the produced linear polymer is placed under suitable conditions, it undergoes a cross-linking reaction to form a hardened film or article of good physical properties. The present invention is based on these findings.

The thermosetting resin of the invention comprises the units of (1) at least one polymerizable monomer having an ampho-ion structure selected from the group consisting of (i) compounds represented by the formula:

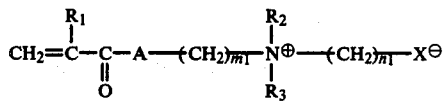

wherein $R_1$ is a hydrogen atom or a methyl group, $R_2$ and $R_3$ are each a $C_1$–$C_6$ alkyl group, A is —O— or —NH—, $m_1$ and $n_1$ are each an integer of 1 to 12 and $X^\ominus$ is $SO_3^\ominus$, $SO_4^\ominus$ or $CO_2^\ominus$ and (ii) compounds represented by either one of the formulae:

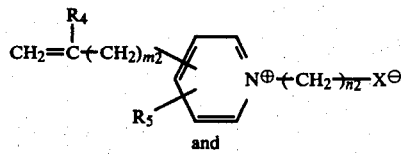

and

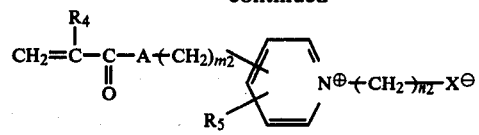

wherein $R_4$ is a hydrogen atom or a methyl group, $R_5$ is a hydrogen atom or a $C_1$–$C_3$ alkyl group, $m_2$ is an integer of 0 to 6, $n_2$ is an integer of 1 to 6 and A and $X^\ominus$ are each as defined above, (2) at least one polymerizable monomer containing an oxirane group selected from the group consisting of (a) compounds represented by either one of the formulae:

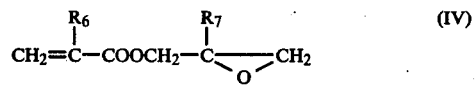

and

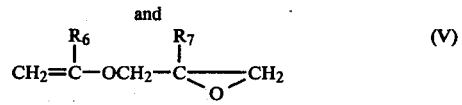

wherein $R_6$ and $R_7$ are each a hydrogen atom or a methyl group and (b) monoacrylates and monomethacrylates of epoxy resins and (3) at least one monomer selected from the group consisting of polymerizable monomers other than the polymerizable monomer having an ampho-ion structure and the polymerizable monomer containing an oxirane group.

For preparation of the thermosetting resin of the invention, (1) at least one of the polymerizable monomers having an ampho-ion structure, (2) at least one of the polymerizable monomers containing an oxirane group and (3) at least one other polymerizable monomer may be subjected to polymerization in the presence of a polymerization initiator according to a per se conventional procedure.

The compound (i) represented by the formula [I] as the polymerizable monomer having an ampho-ion structure (hereinafter referred to as "ampho-ionic monomer") may be prepared by the reaction of an appropriate aminoalkyl acrylate or methacrylate with a sultone or lactone. It may also be prepared by the addition reaction of an acrylate or methacrylate of an appropriate aminoalkyl compound or an acrylamide or methacrylamide of an appropriate aminoalkyl compound with alkylene oxide and $SO_2$ or $SO_3$. Specific examples of the compound (i) are 3-dimethyl(methacryloylethyl)ammonium propanesulfonate, 3-diethyl(methacryloylethyl)ammonium propanesulfonate, 3-dimethyl(acryloylethyl)ammonium propanesulfonate, 3-diethyl(acryloylethyl)ammonium propanesulfonate, 3-dimethyl(methacryloylethyl)ammonium ethanecarboxylate, 3-diethyl(methacryloylethyl)ammonium ethanecarboxylate, 3-dimethyl(acryloylethyl)ammonium ethanecarboxylate, 3-diethyl(acryloylethyl)ammonium ethanecarboxylate etc. The compound (ii) represented by the formula [II] or [III] as the ampho-ionic monomer may be prepared by the reaction of an appropriate vinylpyridine derivative with a sultone or lactone. Specific examples of the compound (ii) are 4-vinylpyridinium propanesulfonate, 2-vinylpyridinium propanesulfonate, 4-vinylpyridinium ethanecarboxylate, 2-vinylpyridinium ethanecarboxylate, etc. These ampho-ionic monomers (i) and (ii) may be used solely or in combination, and may be employed as such or in the form of a solution of suitable concentration.

The compound (a) represented by the formula [IV] or [V] as the polymerizable monomer containing an oxirane group (hereinafter referred to as "oxirane monomer") may be, for example, glycidyl acrylate, glycidyl methacrylate, methaglycidyl acrylate, methaglycidyl methacrylate, vinylglycidyl ether, vinyl methacrylate ether, etc. As the monoacrylate or monomethacrylate of epoxy resin (b) as the oxirane monomer, there may be exemplified a compound represented by the formula:

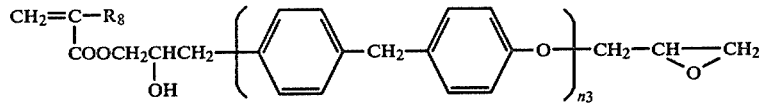

wherein $R_8$ is a hydrogen atom or a methyl group and $n_3$ is an integer of 1 to 10. These oxirane monomers (a) and (b) may be used solely or in combination.

The other polymerizable monomer (hereinafter referred to as "other monomer") may be a usual monomer containing an ethylenic double bond. Specific examples are acrylates or methacrylates having a $C_1$–$C_{12}$ alcohol residue (e.g. methyl acrylate, methyl methacrylate, n-butyl acrylate), polymerizable alcohols (e.g. 2-hydroxyethyl acrylate, 3-hydroxypropyl acrylate, 2-hydroxyethyl methacrylate, 3-hydroxypropyl methacrylate, allyl alcohol, methallyl alcohol), polymerizable amides (e.g. acrylamide, methacrylamide), polymerizable nitriles (e.g. acrylonitrile, methacrylonitrile), polymerizable aromatic compounds (e.g. styrene, α-methylstyrene, vinyltoluene, t-butylstyrene), α-olefin compounds (e.g. ethylene, propylene), vinyl compounds (e.g. vinyl acetate, vinyl propionate), diene compounds (e.g. butadiene, isoprene), etc. Among the other monomer, particularly preferred is a carboxyl group-containing polymerizable monomer (hereinafter referred to as "carboxylmonomer") from the viewpoint of smooth progress of the polymerization. Examples of the carboxyl monomer are acrylic acid, methacrylic acid, maleic acid, itaconic acid, fumaric acid and monoesters of the latter three acids. These monomers may be used solely or in combination.

Usually, the amount of the ampho-ionic monomer to be used for preparation of the thermosetting resin is from 0.3 to 50% (by weight), preferably from 0.5 to 30%, based on the total amount of the monomers. When the amount is less than 0.3%, the resulting thermosetting resin can not undergo a satisfactory hardening reaction. When the amount exceeds 50%, the water-resistance of the hardened film resulting from the thermosetting resin is deteriorated. The amount of the oxirane monomer is usually from 0.5 to 40%, preferably from 1 to 25%, more preferably 4 to 25%. When the amount is less than 0.5%, the resultant thermosetting resin can not attain a sufficient hardened state. When it exceeds 40%, the hardened coating film resulting from the thermosetting resin becomes too fragile, though a sufficient hardness can be obtained. The amount of the other monomer is usually from 10 to 99.2%, preferably from 45 to 98.5%, more preferably from 45 to 95.5%. When the carboxyl monomer is employed as a part of the other monomer, its amount may be 20% or less, preferably 15% or less, to the total amount of the monomers. When the amount exceeds 20%, the water-resistance of the hardened film made by the use of the resultant thermosetting resin is reduced. The lower limit of the carboxyl monomer may be 2% or higher to the total amount of the monomers, since otherwise a meritorious effect attributable thereto will be not produced.

As the polymerization initiator, there may be employed any conventional one such as an organic peroxide (e.g. benzoyl peroxide, t-butyl peroxide, cumene hydroperoxide), an organic azo compound (e.g. azobisisobutyronitrile, azobiscyanovaleric acid, azobis(2,4-dimethyl)valeronitrile, azobis(2-aminopropane) hydrochloride), an inorganic water-soluble radical initiator (e.g. potassium persulfate, ammonium persulfate, sodium persulfate, hydrogen peroxide) or a redox initiator comprising the said inorganic water-soluble radical initiator with sodium pyrosulfite, sodium hydrogensulfite, ferric ion or the like. These compounds may be used solely or in combination. The amount of the polymerization initiator is usually 0.05 to 5% by weight, preferably 0.1 to 3% by weight, based on the total amount of the monomers. If necessary, a suitable amount of an ordinary chain transfer agent such as a mercaptan (e.g. laurylmercaptan, hexylmercaptan) may be employed together with the polymerization initiator.

The polymerization reaction may be carried out by a conventional procedure for emulsion polymerization, suspension polymerization, bulk polymerization, solution polymerization or the like depending on the state of the resin system as desired. In case of obtaining an aqueous dispersion of thermosetting resin by an emulsion polymerization procedure or a suspension polymerization procedure, the use of an emulsifying agent or a dispersing agent is not necessary, because the ampho-ionic monomer possesses the functions of these agents. Thus, the monomers can be polymerized simply in water. This is quite advantageous, because the presence of an emulsifying agent or a dispersing agent in a composition of a thermosetting resin results in deterioration of the quality of a hardened film formed therewith.

The following is a detailed explanation of the operations employed in case of polymerization in water.

The ampho-ionic monomer or its aqueous solution (if necessary admixed with the carboxyl monomer) and a mixture of the oxirane monomer and the other monomer (optionally including the carboxyl monomer) are separately and simultaneously added, in 5 to 300 minutes, to water as the reaction medium containing the polymerization initiator (if necessary admixed with a hydrophilic organic solvent) and kept at a designed polymerization temperature (usually 4° to 100° C.) in the atmosphere of an inert gas under atmospheric or elevated pressure. After completion of the addition, the resulting mixture is kept at the same temperature for a period of 5 minutes to 10 hours, whereby a milky or creamy, aqueous dispersion of thermosetting resin containing 5 to 70% by weight of involatile components is obtained. In the aqueous dispersion state during and after the polymerization reaction, it is supposed that the ampho-ion groups having a strong hydrophilic property are situated at the water layer part of the resin particles, and the hydrophobic oxirane groups are inside the resin particles. Therefore, cross-linking does not occur at the stages of production and of storage, and an extremely stable aqueous dispersion of thermosetting resin is obtainable.

The adoption of other polymerization procedures such as bulk polymerization and solution polymerization can also prevent cross-linking at the stages of production and storage.

While the separation of the produced thermosetting resin from the reaction mixture obtained by the polymerization is not necessarily required, particularly when the product is used as a paint composition or an adhesive agent, it may be effected by a per se conventional procedure such as salting out when desired.

The thus obtained thermosetting resin comprises a linear random copolymer having a molecular weight of from about 3000 to 500,000 and a glass transition temperature of from about −20° to 80° C. Determination of these resin qualities may be carried out by conventional procedures. For instance, the molecular weight is measured by the gel permeation chromatography method, the osmotic method, the light-scattering method or the like. The glass transition temperature is determined from the volume thermal expansion coefficient measured by the aid of a dilatometer. In the infrared absorption spectrum of the thermosetting resin, the characteristic absorption of the oxirane group is observed at wave numbers of 1250, 910 and 845, and that of the ampho-ion group (for instance in case of $X^{\ominus}$ being $SO_3^{\ominus}$) is confirmed at wave numbers of 1040 and 3400. The presence of the carboxyl group, if any, can be confirmed by alkali titration.

The thermosetting resin possessing the said resin qualities is applicable in an extremely wide range of pH values owing to the effect of the ampho-ion groups present therein, and can afford a hardened coating film having excellent water resistance and solvent resistance. Thus, it is particularly useful as a resin for painting.

The paint composition of the invention comprises the said thermosetting resin as the major and essential ingredient. When the thermosetting resin is produced by emulsion polymerization, the reaction mixture (i.e. an aqueous dispersion of the produced thermosetting resin) per se can be used as the paint composition. In case of necessity, other components such as conventional resin vehicles (e.g. aminoplast resins, phenoplast resins, epoxy resins), organic and inorganic coloring pigments, extender pigments and anti-corrosive pigments, fillers, volume-increasing materials, viscosity-increasing agents, surface active agents, pH-regulating agents, water and organic solvents may be incorporated therein. Incorporation of an aliphatic polycarboxylic acid (e.g. adipic acid, decanedicarboxylic acid), an aromatic polycarboxylic acid (e.g. phthalic acid, isophthalic acid, terephthalic acid, trimellitic acid) or the like is sometimes effective in promoting the hardening reaction. In general, the concentration of the thermosetting resin in the paint composition may be from about 3 to 75% by weight.

The thus prepared paint composition is applied to an appropriate substrate such as metal, wood, paper or plastics to make a film of 5 to 500μ in thickness by a conventional procedure, and dried at a temperature of about 60° to 240° C. for a period of about 20 seconds to 60 minutes whereby an excellent hardened coating film can be obtained.

As understood from the above descriptions, one of the characteristic features of the present invention resides in polymerization of the oxirane monomer and the other monomer (optionally including the carboxyl monomer) in the presence of the ampho-ionic monomer.

By the use of the ampho-ionic monomer, the polymerization can be successfully accomplished in an aqueous medium without using an emulsifying agent or a dispersing agent. Since the resulting composition of the thermosetting resin includes neither an emulsifying agent nor a dispersing agent, the film formed with such composition has a good quality.

Further, the use of the ampho-ionic monomer is effective in obtaining a stable aqueous dispersion of the thermosetting resin, which does not undergo cross-linking during its production or on storage. Thus, the resulting composition does not include any gel or resinous lumps, so that it can be used to form a film of good quality.

In spite of the stabilization effect of the ampho-ionic structure as stated above, it has on the other hand a function of initiating and promoting the ring opening of an oxirane group. Therefore, the hardening reaction of the thermosetting resin proceeds easily and smoothly when the oxirane group and the ampho-ionic structure are placed under conditions which will allow their close contact, for instance, by evaporation of the dispersing medium.

The present invention will be hereinafter explained further in detail with reference to the following wherein parts and percents are by weight.

REFERENCE EXAMPLE 1

In a 2 liter volume separable flask equipped with a stirrer, a cooler and a thermometer, N,N-dimethylaminoethyl methacrylate (350 g) and acetone (800 g) are charged, and the contents are stirred at 30° C. A mixture of 1,3-propanesultone (272 g) and acetone (100 g) is dropwise added thereto in 30 minutes. After completion of the addition, the mixture is stirred at the same temperature for 4 hours and then allowed to stand at room temperature for one day. The precipitated white crystals are collected by filtration, washed with acetone and dried under reduced pressure to obtain 3-dimethyl(methacryloylethyl)ammonium propanesulfonate [A] having the following structure:

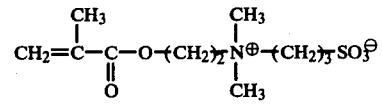

Yield, 591 g (96%). M.P. 149° C.

REFERENCE EXAMPLE 2

In the same flask as in Reference Example 1, N,N-dimethylaminoethyl methacrylate (628 g) and methyl ethyl ketone (400 g) are charged, and the contents are stirred at 0° C. A mixture of β-propiolactone (288 g) and methyl ethyl ketone (300 g) is dropwise added thereto in 1 hour. After completion of the addition, the mixture is stirred at the same temperature for a further 4 hours and then allowed to stand in a refrigerator for one day. The precipitated white crystals are collected by filtration, washed with methyl ethyl ketone and dried under reduced pressure to obtain 3-dimethyl(methacryloylethyl)ammonium ethanecarboxylate [B] having the following structure:

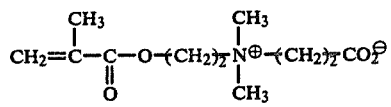

Yield, 756 g (83%). M.P. 102° C.

EXAMPLE 1

In a 2 liter volume reaction vessel equipped with a stirrer, a cooler, a temperature-controlling apparatus and a tube for introduction of nitrogen gas, deionized water (300 parts) is charged, and while stirring at 80° C. in nitrogen atmosphere, potassium persulfate (4.5 parts) and sodium hydrogensulfite (1.5 parts) are added thereto. The first mixed solution comprising the compound [A] (10 parts) obtained in Reference Example 1 and deionized water (150 parts) and the second mixed solution comprising methyl methacrylate (155 parts), n-butyl acrylate (155 parts), styrene (155 parts), glycidyl methacrylate (20 parts) and laurylmercaptan (5 parts) are dropwise added thereto separately and simultaneously in 12 minutes at the same temperature. After completion of the addition, a mixture of potassium persulfate (1.5 parts), sodium hydrogensulfite (0.5 parts) and deionized water (50 parts) is added thereto at the same temperature, and stirring is continued for a further 30 minutes to obtain an aqueous milky dispersion of thermosetting resin (particle size, 0.152μ) of pH 1.8 containing 50% of involatile components and showing a viscosity of 55 cps (at 30° C.) The thus obtained dispersion is uniform and stable against formation of lumps and, even when adjusted to pH 11 by the addition of triethylamine, does not lose its stability. The molecular weight ($\overline{M}n$) and glass transition temperature of the resin are 30000° and 38° C., respectively.

EXAMPLES 2 to 14

Using the first mixed solutions and the second mixed solutions as shown in Table 1, the same procedure as in Example 1 is repeated to obtain aqueous dispersions of thermosetting resins (Nos. 2 to 14). The properties of the thus prepared dispersions and the molecular weights and glass transition temperatures of the resins in such dispersions are shown in Table 1.

EXAMPLE 15

In the same reaction vessel as in Example 1, deionized water (288.8 parts) is charged, and while stirring at 90° C. in a nitrogen stream, a mixture of azobiscyanovaleric acid (4 parts), dimethylethanolamine (2.8 parts) and deionized water (40 parts) is added thereto. Then, the first mixed solution comprising the compound [A] obtained in Reference Example 1 (12 parts) and deionized water (120 parts), the second mixed solution comprising methyl methacrylate (102 parts), n-butyl acrylate (136 parts), styrene (102 parts) and glycidyl methacrylate (48 parts) and the third mixed solution comprising azobiscyanovaleric acid (4 parts), dimethylethanolamine (2.8 parts) and deionized water (40 parts) are dropwise added thereto separately and simultaneously in 20 minutes at the same temperature. After completion of the addition, stirring is continued for a further 10 minutes at the same temperature to obtain an aqueous milky dispersion of thermosetting aqueous resin. Content of involatile components, 45%. pH, 6.7. Viscosity, 86 cps. Particle size, 0.122μ. The molecular weight ($\overline{M}n$) and glass transition temperature of the resin are 86000° and 25° C., respectively.

EXAMPLE 16

The production of a resin is effected in the same procedure as in Example 1 but using the compound [B] (10 parts) obtained in Reference Example 2 in place of the compound [A] to obtain an aqueous milky dispersion of thermosetting resin. Content of involatile components, 50%. pH, 2.1. Viscosity, 80 cps. Particle size, 0.188μ. The thus prepared dispersion is uniform and stable like the dispersion obtained in Example 1. The molecular weight ($\overline{M}n$) and glass transition temperature of the resin are 30000° and 38° C., respectively.

EXAMPLE 17

In the same reaction vessel as in Example 1, ethylene glycol monoethyl ether (100 parts) and methyl isobutyl ketone (50 parts) are charged, and while stirring at 60° C. in a nitrogen stream, azobis (2,4-dimethyl)valeronitrile (2 parts) is added thereto. Then, the first mixed solution comprising ethylene glycol monoethyl ether (100 parts) and the compound [A] obtained in Reference Example 1 (10 parts) and the second mixed solution comprising methyl methacrylate (155 parts), n-

Table 1

| Example No. | First mixed solution Compound A obtained in Reference Example 1 | Deionized water | Second mixed solution Methyl methacrylate | n-Butyl acrylate | Styrene | Glycidyl methacrylate | Lauryl mercaptan | Properties Involatile components (%) | pH | Viscosity (cps) | Particle size (μ) | Molecular weight ($\overline{M}n$) × 10³ | Glass transition temperature (°C.) |
|---|---|---|---|---|---|---|---|---|---|---|---|---|---|
| 2 | 5 | 150 | 165 | 165 | 160 | 5 | — | 50 | 1.8 | 55 | 0.202 | 150 | 41 |
| 3 | 5 | 150 | 130 | 130 | 125 | 100 | 10 | 50 | 1.8 | 60 | 0.212 | 10 | 32 |
| 4 | 10 | 150 | 160 | 160 | 160 | 10 | — | 50 | 1.9 | 75 | 0.168 | 120 | 40 |
| 5 | 10 | 150 | 150 | 150 | 147.5 | 40 | 2.5 | 50 | 1.7 | 78 | 0.172 | 80 | 36 |
| 6 | 10 | 150 | 135 | 135 | 135 | 80 | 5 | 50 | 1.7 | 84 | 0.188 | 30 | 34 |
| 7 | 20 | 150 | 155 | 155 | 150 | 20 | — | 50 | 1.8 | 104 | 0.182 | 120 | 38 |
| 8 | 20 | 150 | 140 | 140 | 140 | 60 | — | 50 | 1.6 | 88 | 0.152 | 130 | 35 |
| 9 | 20 | 150 | 135 | 135 | 130 | 80 | — | 50 | 1.9 | 86 | 0.144 | 110 | 34 |
| 10 | 20 | 150 | 120 | 115 | 115 | 120 | 10 | 50 | 1.9 | 72 | 0.146 | 8 | 31 |
| 11 | 40 | 150 | 150 | 145 | 145 | 20 | — | 50 | 1.7 | 84 | 0.128 | 110 | 38 |
| 12 | 40 | 150 | 140 | 140 | 135 | 40 | 5 | 50 | 1.6 | 92 | 0.111 | 26 | 36 |
| 13 | 80 | 150 | 120 | 120 | 120 | 60 | 5 | 50 | 1.8 | 95 | 0.102 | 25 | 35 |
| 14 | 120 | 150 | 115 | 110 | 110 | 40 | 5 | 50 | 1.8 | 112 | 0.094 | 25 | 36 | butyl acrylate (155 parts), styrene (155 parts), glycidyl methacrylate (20 parts), laurylmercaptan (5 parts), azobis(2,4-dimethyl)valeronitrile (8 parts), toluene (150 parts) and methyl isobutyl ketone (100 parts) are dropwise added thereto separately and simultaneously in 1.5 hours at the same temperature. After completion of the addition, stirring is continued for a further 30 minutes at 65° to 70° C. to obtain a solution of thermosetting resin. The content of involatile components is 50%. The molecular weight ($\overline{M}n$) and glass transition temperature of the resin are 20000° and 38° C., respectively.

resin. The content of involatile components is 50%. The molecular weight ($\overline{M}n$) and glass transition temperature of the resin are 30,000° and 39° C., respectively.

EXAMPLES 21 to 38

Various aqueous dispersions of thermosetting resins (Nos. 21 to 38) are prepared in the same procedure as in Example 1 but using the first mixed solution and the second mixed solution as shown in Table 2. The properties of the thus obtained dispersions and the molecular weights and glass transition temperatures of the resins are shown in Table 2.

Table 2

| | Composition (part(s)) | | | | | | | | | Properties | | | | Glass |
|---|---|---|---|---|---|---|---|---|---|---|---|---|---|---|
| | First mixed solution | | | Second mixed solution | | | | | | | | | Molecular | transition |
| Example No. | Compound A obtained in Reference Example 1 | Acrylic acid | Deionized water | Methyl methacrylate | n-Butyl acrylate | Styrene | Glycidyl methacrylate | Acrylic acid | Lauryl mercaptan | Involatile components (%) | pH | Viscosity (cps) | Particle size (μ) | weight ($\overline{M}n$) × 10³ | temperature (°C.) |
| 21 | 10 | 10 | 150 | 155 | 155 | 150 | 20 | — | — | 50 | 1.8 | 82 | 0.188 | 140 | 39 |
| 22 | 10 | 20 | 150 | 145 | 145 | 140 | 40 | — | — | 50 | 1.8 | 116 | 0.192 | 120 | 37 |
| 23 | 10 | 30 | 150 | 135 | 135 | 135 | 60 | — | — | 50 | 1.8 | 120 | 0.190 | 120 | 32 |
| 24 | 10 | 40 | 150 | 130 | 130 | 130 | 60 | — | 5 | 50 | 1.9 | 120 | 0.168 | 23 | 32 |
| 25 | 10 | 80 | 150 | 115 | 115 | 115 | 60 | — | 5 | 50 | 1.9 | 100 | 0.173 | 110 | 32 |
| 26 | 20 | 10 | 150 | 140 | 140 | 140 | 40 | 10 | — | 50 | 1.8 | 98 | 0.150 | 80 | 37 |
| 27 | 20 | — | 150 | 135 | 135 | 130 | 40 | 40 | — | 50 | 1.9 | 72 | 0.144 | 80 | 38 |
| 28 | 20 | 50 | 150 | 130 | 130 | 130 | 40 | — | — | 50 | 1.7 | 80 | 0.142 | 60 | 38 |
| 29 | 20 | 20 | 150 | 110 | 110 | 105 | 120 | 10 | 5 | 50 | 1.6 | 82 | 0.162 | 22 | 30 |
| 30 | 20 | 20 | 150 | 115 | 115 | 115 | 90 | 20 | 5 | 50 | 1.6 | 104 | 0.153 | 18 | 37 |
| 31 | 20 | 30 | 150 | 130 | 130 | 130 | 60 | — | — | 50 | 1.7 | 132 | 0.154 | 110 | 36 |
| 32 | 20 | 30 | 150 | 145 | 145 | 140 | 20 | — | — | 50 | 1.8 | 104 | 0.140 | 120 | 39 |
| 33 | 40 | 10 | 150 | 140 | 135 | 135 | 40 | — | — | 50 | 1.8 | 95 | 0.120 | 80 | 39 |
| 34 | 40 | 20 | 150 | 120 | 120 | 120 | 80 | — | — | 50 | 1.8 | 111 | 0.113 | 80 | 37 |
| 35 | 80 | 10 | 150 | 115 | 115 | 115 | 60 | — | 5 | 50 | 1.9 | 113 | 0.102 | 16 | 35 |
| 36 | 80 | 20 | 150 | 115 | 110 | 110 | 60 | — | 5 | 50 | 1.7 | 120 | 0.104 | 60 | 35 |
| 37 | 120 | 10 | 150 | 105 | 100 | 100 | 60 | — | 5 | 50 | 1.8 | 220 | 0.097 | 50 | 34 |
| 38 | 120 | 20 | 150 | 100 | 100 | 95 | 60 | — | 5 | 50 | 1.8 | 240 | 0.096 | 50 | 34 |

EXAMPLE 18

The production of a resin is effected in the same procedure as in Example 17 but using the compound [B] (10 parts) obtained in Reference Example 2 in place of the compound [A] to obtain a solution of thermosetting resin. Content of involatile components, 50%. The molecular weight ($\overline{M}n$) and glass transition temperature of the resin are 20,000° and 38° C., respectively.

EXAMPLE 19

The production of a resin is effected in the same procedure as in Example 17 but adding simultaneously the first mixed solution comprising the compound [A] (10 parts) obtained in Reference Example 1, acrylic acid (10 parts) and ethylene glycol monoethyl ether (100 parts) and the second mixed solution comprising methyl methacrylate (150 parts), n-butyl acrylate (155 parts), styrene (150 parts), glycidyl methacrylate (20 parts), laurylmercaptan (5 parts), azobis(2,4-dimethyl)valeronitrile (8 parts), toluene (150 parts) and methyl isobutyl ketone (100 parts) and stirring the mixture after completion of the addition at 60° C. for 30 mixture to obtain a solution of thermosetting resin. The content of involatile components is 50%. The molecular weight ($\overline{M}n$) and glass transition temperature of the resin are 33,000° and 39° C., respectively.

EXAMPLE 20

The production of a resin is effected in the same procedure as in Example 19 but using the compound [B] (10 parts) obtained in Reference Example 2 in place of the compound [A] to obtain a solution of thermosetting

EXAMPLE 39

The aqueous dispersions of thermosetting resins obtained in Examples 1 to 38 are as such employed as paint compositions. Each of them is applied to a tin plate to form a film of about 40μ in thickness on drying, and baked at 100° C., 120° C., 140° C. or 160° C. for 30 minutes, whereby a transparent, elastic, hardened coating film showing an appropriate hardness (HB or more in pencil hardness) is obtained. The thus formed coating film shows an excellent water resistance (remaining normal after immersion in tap water at room temperature for 240 hours) and a high solvent resistance (remaining normal by the spot test with gasoline).

EXAMPLE 40

The aqueous dispersion of thermosetting resin (100 parts) obtained in Example 3 or 6 is admixed with a 50% aqueous solution (20 parts) of 1,12-dodecanedicarboxylic acid neutralized with triethylamine to make a paint composition, which is applied to a tin plate and dried at a designed temperature from 100° to 160° C. for 30 minutes as in Example 39, whereby a transparent, elastic, hardened coating film having an appropriate hardness (HB or more in pencil hardness) can be obtained. The thus prepared coating film shows an excellent water resistance (remaining normal after immersion in tap water at room temperature for 240 hours) and a high solvent resistance (remaining normal by the spot test with gasoline).

The thermosetting resin of the present invention is characteristic in having a good self cross-linking property, and a film formed by cross-linking of such thermosetting resin affords an acetone-insoluble solid content of not less than 50% by weight, particularly from 60 to 99% by weight when determined by the following procedure:

An aqueous dispersion of the thermosetting resin (having a content of non-volatile components of about 50% by weight) is applied to a tin plate to give a film of 10 to 15μ in thickness on drying and baked at a temperature of about 160° C. for a period of 10 minutes to give a hardened coating film. The coated tin plate is put in a Soxhlet's extractor and extracted with acetone while refluxing for 3 hours. The percentage of the acetone-insoluble components is calculated according to the following equation:

$$\text{Acetone-insoluble component percentage (\%)} = \frac{\text{Weight of coated tin plate after extraction} - \text{Weight of tin plate}}{\text{Weight of coated tin plate before extraction} - \text{Weight of tin plate}} \times 100,$$

and this value is taken as the acetone-insoluble solid content in the coating film.

We claim:

1. A process for preparing a thermosettable resin of self cross-linking type, which comprises polymerizing (1) 0.5 to 30% by weight of at least one polymerizable monomer having an ionic structure selected from the group consisting of (i) a compound of the formula:

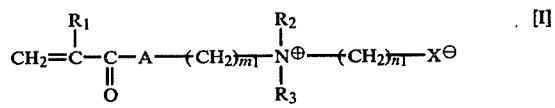

wherein $R_1$ is hydrogen or methyl, $R_2$ and $R_3$ are each $C_1$-$C_6$ alkyl, A is —O— or —NH—, $m_1$ and $n_1$ are each an integer of 1 to 12 and $X^\ominus$ is $SO_3^\ominus$, $SO_4^\ominus$ or $CO_2^\ominus$, (ii) a compound of the formula:

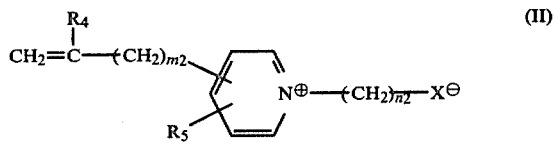

and (iii) a compound of the formula:

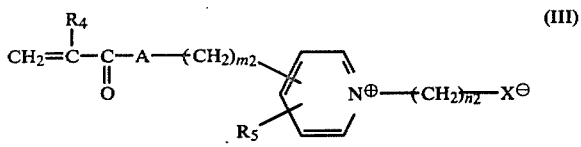

wherein, the formulae (II) and (III), $R_4$ is hydrogen or methyl, $R_5$ is hydrogen or $C_1$-$C_3$ alkyl, $m_2$ is zero or an integer of 1 to 6, $n_2$ is an integer of 1 to 6 and A and $X^\ominus$ are each as defined above, (2) 1 to 25% by weight of at least one polymerizable monomer containing an oxirane group selected from the group consisting of a compound of the formula:

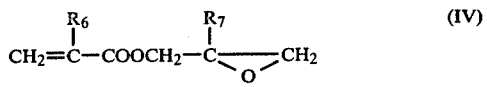

and a compound of the formula:

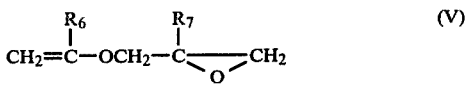

wherein, in formulae (IV) and (V), $R_6$ and $R_7$ are each hydrogen or methyl, and (3) 45 to 98.5% by weight of at least one ethylenically unsaturated polymerizable monomer other than said polymerizable monomer having an ionic structure and said polymerizable monomer containing an oxirane group, said polymerization being carried out in the presence of 0.05 to 5% by weight of a polymerization initiator, based on the total weight of the monomers to be polymerized, with the proviso that the polymerizable monomer component (3) includes a carboxyl group-containing polymerizable monomer selected from the group consisting of acrylic acid, methacrylic acid, maleic acid, a monoester of maleic acid, itaconic acid, a monoester of itaconic acid, fumaric acid and a monoester of fumaric acid, of which the amount is from 2 to 20% by weight based on the total weight of the monomers to be polymerized said thermosettable resin of self cross-linking type having a property such that if an aqueous dispersion of said resin in a concentration of 50% by weight is applied to a tin plate and dried to obtain a film having a thickness of 10 to 15μ, and said film is baked at 160° C. for 10 minutes to obtain a hardened film, said hardened film will have an acetone-insoluble solid content of not less than 50% by weight.

2. The process according to claim 1, wherein the polymerization initiator is an organic peroxide, an organic azo compound, an inorganic water-soluble radical initiator or a redox initiator comprising said inorganic water-soluble radical initiator in combination with sodium pyrosulfite, sodium hydrogensulfite or ferric ion.

3. The process according to claim 1, wherein the polymerization is carried out in an aqueous medium.

4. The process according to claim 1, wherein the polymerization is carried out by keeping a mixture of the monomers to be polymerized in an aqueous medium containing a polymerization initiator at a temperature of 4° to 100° C. to give a milky or creamy, aqueous dispersion of thermosettable resin.

5. A thermosettable resin having a number average molecular weight of from about 3000 to 500,000, when measured by gel permeation chromatography, and a glass transition temperature of from −20° to 80° C., which is prepared by the process as claimed in claim 1.

6. A paint composition comprising the thermosettable resin according to claim 5.

* * * * *